US010992227B2

(12) United States Patent
Chiu et al.

(10) Patent No.: US 10,992,227 B2
(45) Date of Patent: Apr. 27, 2021

(54) POWER SUPPLY APPARATUS AND CONTROL METHOD THEREOF

(71) Applicant: Chicony Power Technology Co., Ltd., New Taipei (TW)

(72) Inventors: Jung-Ching Chiu, New Taipei (TW); Chien-Lung Liu, New Taipei (TW); You-Chen Kuo, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 16/663,315

(22) Filed: Oct. 24, 2019

(65) Prior Publication Data
US 2021/0050780 A1 Feb. 18, 2021

(30) Foreign Application Priority Data
Aug. 14, 2019 (TW) ................. 108128921

(51) Int. Cl.
*H02M 3/156* (2006.01)
*G05F 1/565* (2006.01)
*H02M 3/06* (2006.01)

(52) U.S. Cl.
CPC ........... *H02M 3/156* (2013.01); *G05F 1/565* (2013.01); *H02M 3/06* (2013.01)

(58) Field of Classification Search
CPC .................................................. G05B 11/42
See application file for complete search history.

(56) References Cited

U.S. PATENT DOCUMENTS

| 5,029,066 A * | 7/1991 | Hiroi .................. G05B 11/42 700/42 |
| 6,965,502 B2 | 11/2005 | Duffy et al. |
| 7,007,176 B2 | 2/2006 | Goodfellow et al. |
| 7,719,251 B2 | 5/2010 | Qahouq et al. |
| 8,742,744 B2 | 6/2014 | Abu Qahouq |
| 10,394,294 B2 * | 8/2019 | Pfeifer ................ G06F 1/325 |
| 2010/0033150 A1 | 2/2010 | Irissou et al. |
| 2011/0273157 A1 | 11/2011 | Abu-Qahouq |

(Continued)

FOREIGN PATENT DOCUMENTS

| CN | 101534053 | 9/2009 |
| CN | 105871208 | 8/2016 |

(Continued)

*Primary Examiner* — Peter M Novak
(74) *Attorney, Agent, or Firm* — JCIPRNET

(57) ABSTRACT

A power supply apparatus and a control method thereof are provided. Power conversion is performed according to a switching signal group to provide an output voltage and an output current. An error value between the output voltage and a reference voltage is multiplied by a proportional parameter to obtain a proportional result. The error value is multiplied by an integration parameter to obtain a first calculation value which is then accumulated over time to obtain an integration result. When a slope of the output current is greater than a reference slope and a slope of the output voltage is negative, the slope of the output voltage is multiplied by a differential parameter to obtain a second calculation value which is then added to the integration result over time. A duty cycle of the switching signal group is adjusted according to the sum of the proportional result and the integration result.

10 Claims, 6 Drawing Sheets

(56) References Cited

U.S. PATENT DOCUMENTS

2014/0257269 A1* 9/2014 Woloszko ............ A61B 18/042
606/34
2019/0302818 A1* 10/2019 Liu ...................... H02M 3/156
2020/0044570 A1* 2/2020 Kurokawa ........ H02M 3/33515

FOREIGN PATENT DOCUMENTS

| CN | 106054995 | 8/2017 |
| CN | 107707101 | 2/2018 |
| CN | 105137148 | 2/2019 |
| TW | I534568 | 5/2016 |
| TW | I645648 | 12/2018 |
| WO | 2013149196 | 10/2013 |

* cited by examiner

POWER SUPPLY APPARATUS AND CONTROL METHOD THEREOF

CROSS-REFERENCE TO RELATED APPLICATION

This application claims the priority benefit of Taiwan application serial no. 108128921, filed on Aug. 14, 2019. The entirety of the above-mentioned patent application is hereby incorporated by reference herein and made a part of this specification.

BACKGROUND

Technical Field

The invention relates to a power supply technology, and particularly relates to a power supply apparatus capable of quickly stabilizing an output voltage in response to a load variation and a control method thereof.

Description of Related Art

Generally, in a power supply apparatus based on pulse width modulation (PWM), the power supply apparatus usually has a feedback circuit and a PWM control circuit. The feedback circuit may provide a feedback signal according to a load variation (no load, a light load, a medium load, a full load) of the power supply apparatus, and the PWM control circuit may correspondingly adjust a duty cycle of a PWM signal according to the feedback signal, so as to stabilize an output voltage of the power supply apparatus.

However, in order to increase a power density of the power supply apparatus, it is necessary to reduce design space of a circuit board in the power supply apparatus, resulting in a reduction in the number of power components available for use by the power supply apparatus, particularly output capacitors used for stabilizing the output voltage. The reduction in the number of the output capacitors is likely to cause an unstable output voltage.

Moreover, a huge variation of the load from a light load to a heavy load may cause a failure to quickly reflect the variation of the load in a response speed of the PWM control circuit, which may also result in an unstable output voltage.

SUMMARY

The invention is directed to a power supply apparatus and a control method thereof, which improve stability of an output voltage and shorten time required for stabilizing the output voltage according to a slope of an output current and a slope of the output voltage of the power supply apparatus.

A power supply apparatus of the invention includes a switch-based power conversion circuit and a control circuit. The power conversion circuit is configured to perform power conversion according to a switching signal group to provide an output voltage and an output current. The control circuit is coupled to the power conversion circuit, and is configured to detect the output voltage and the output current to generate the switching signal group accordingly. The control circuit generates an error value according to the output voltage and a reference voltage, multiplies the error value by a proportional parameter to obtain a proportional result, multiplies the error value by an integration parameter to obtain a first calculation value, and accumulates the first calculation value over time to obtain an integration result. When a slope of the output current is greater than a first reference slope and a slope of the output voltage is a negative slope, the control circuit multiplies the slope of the output voltage by a first differential parameter to obtain a second calculation value, the control circuit adds the second calculation value to the integration result over time, and the control circuit adjusts a duty cycle of the switching signal group to stabilize the output voltage according to a sum of the proportional result and the integration result.

A control method of a power supply apparatus of the invention includes following steps. Power conversion is performed by a power conversion circuit of the power supply apparatus according to a switching signal group to provide an output voltage and an output current. Following steps are executed by a control circuit of the power supply apparatus. An error value between the output voltage and a reference voltage is calculated. The error value is multiplied by a proportional parameter to obtain a proportional result. The error value is multiplied by an integration parameter to obtain a first calculation value, and the first calculation value is accumulated over time to obtain an integration result. When a slope of the output current is greater than a first reference slope and a slope of the output voltage is a negative slope, the slope of the output voltage is multiplied by a first differential parameter to obtain a second calculation value, and the second calculation value is added to the integration result over time. A duty cycle of the switching signal group is adjusted according to a sum of the proportional result and the integration result to stabilize the output voltage.

Based on the above, in the power supply apparatus and the control method thereof provided by the invention, the control circuit multiplies the slope of the output voltage by the first differential parameter to obtain the second calculation value when the slope of the output current is greater than the first reference slope and the slope of the output voltage is a negative slope, and adds the second calculation value to the integration result over time to serve as a basis for adjusting the duty cycle of the switching signal group. In this way, an adjustment speed of the duty cycle of the switching signal group is increased, so as to improve the stability of the output voltage and shorten the time required for stabilizing the output voltage.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
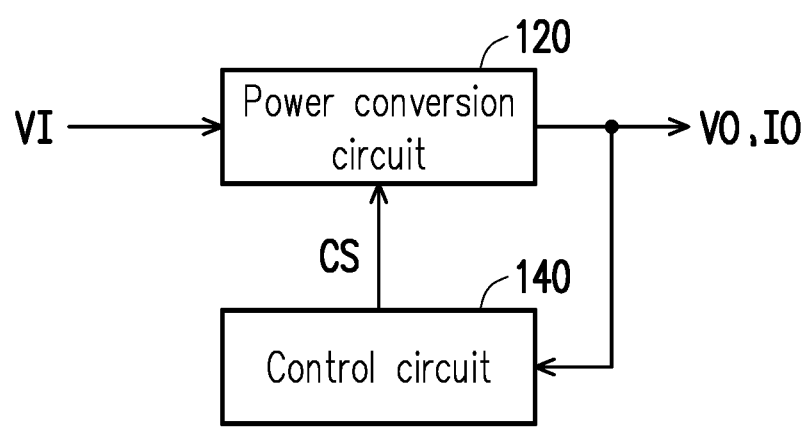
FIG. 1 is a schematic functional block diagram of a power supply apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic functional block diagram of a power supply apparatus according to an embodiment of the invention. Referring to FIG. 1, a power supply apparatus 100 includes a switch-based power conversion circuit 120 and a control circuit 140. The power conversion circuit 120 is configured to receive an input voltage VI and a switching signal group CS. The power conversion circuit 120 executes power conversion on the input voltage VI according to the switching signal group CS to provide an output voltage VO and an output current IO, and provides the output voltage VO and the output current IO to a load of the power supply apparatus 100.

In an embodiment of the invention, the power conversion circuit 120 may be an existing switch-based power converter, and a circuit structure of the power conversion circuit 120 is not limited by the invention.

The control circuit 140 is coupled to the power conversion circuit 120, and is configured to detect the output voltage VO and the output current IO to generate the switching signal group CS accordingly. In detail, when the load of the power supply apparatus 100 varies, the control circuit 140 detects a variation of the load according to a slope of the output current IO and a slope of the output voltage VO, and accordingly adjusts a duty cycle of the switching signal group CS to stabilize the output voltage VO.

Figure 2:
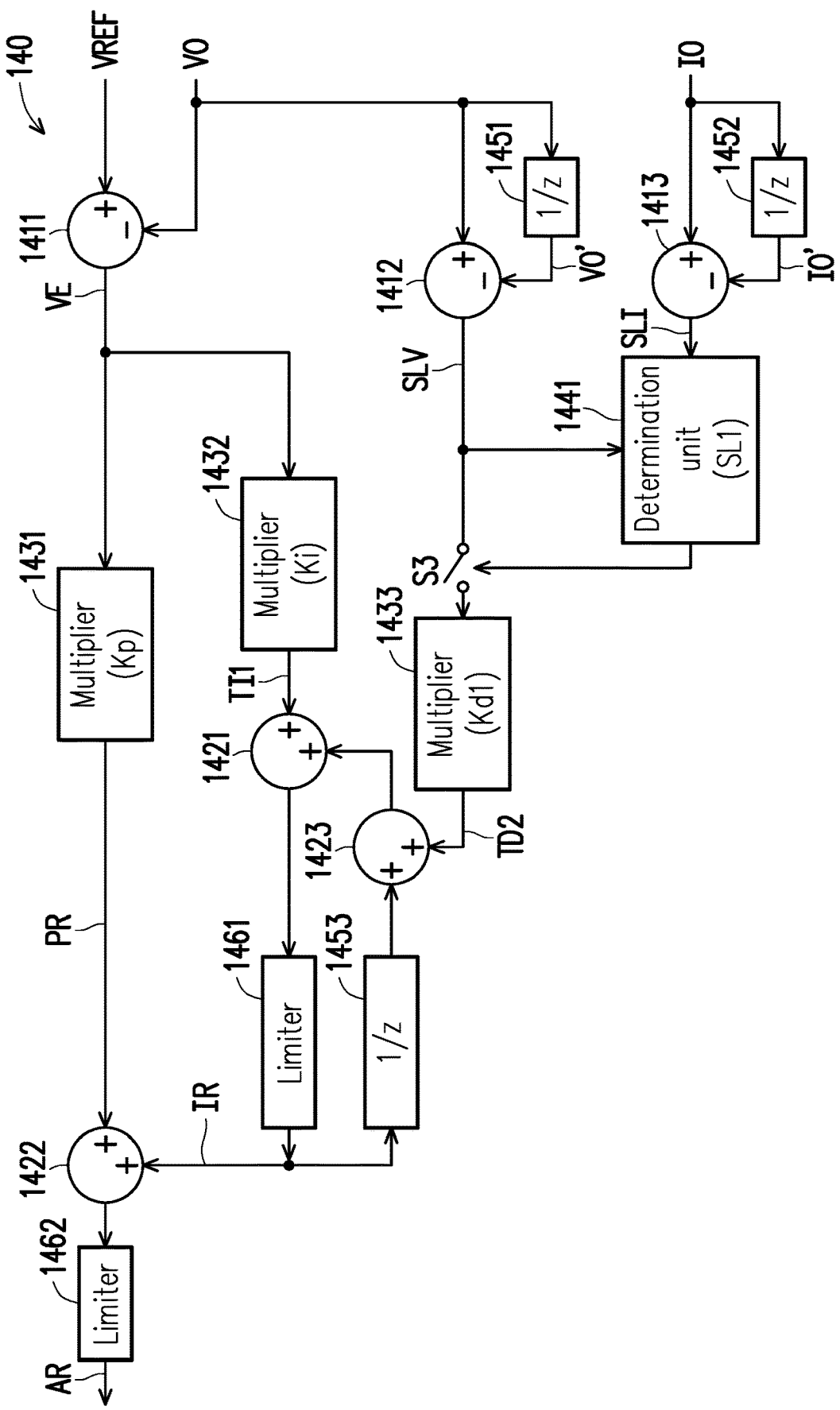
FIG. 2 is a schematic partial functional block diagram of a control circuit according to an embodiment of the invention.
Figure 3A:
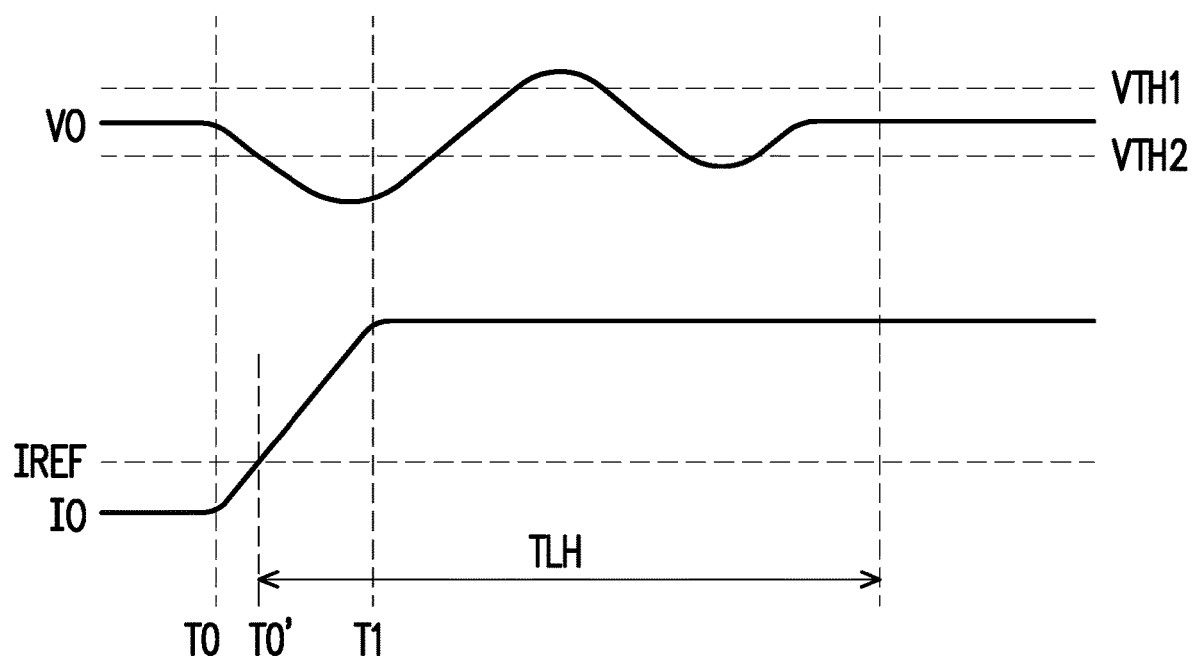
FIG. 3A is a schematic timing diagram of an output voltage and an output current in response to a load variation of the power supply apparatus according to an embodiment of the invention.

Further, FIG. 2 is a schematic partial functional block diagram of the control circuit according to an embodiment of the invention, and FIG. 3A is a schematic timing diagram of the output voltage and the output current in response to the load variation of the power supply apparatus according to an embodiment of the invention. Referring to FIG. 1, FIG. 2 and FIG. 3A together, the control circuit 140 generates an error value VE according to the output voltage VO and a reference voltage VREF. The control circuit 140 multiples the error value VE by a proportional parameter Kp to obtain a proportional result PR. Moreover, the control circuit 140 multiples the error value VE by an integration parameter Ki to obtain a first calculation value TI1, and accumulates the first calculation value TI1 over time to obtain an integration result IR.

Besides, the control circuit 140 calculates a slope SLV of the output voltage VO and a slope SLI of the output current IO. Particularly, when the load of the power supply apparatus 100 changes from a light load to a heavy load, the output current IO extracted from the power supply apparatus 100 by the load drastically rises, which results an instantaneous drop of the output voltage VO. Therefore, when the slope SLI of the output current IO is greater than a first reference slope SL1 and the slope SLV of the output voltage VO is a negative slope (for example, a negative slope section between time points T0 and T1 shown in FIG. 3A), the control circuit 140 multiplies the slope SLV of the output voltage VO by a first differential parameter Kd1 to obtain a second calculation value TD2. The control circuit 140 adds the second calculation value TD2 to the integration result IR over time, and the control circuit 140 adjusts the duty cycle of the switching signal group CS to stabilize the output voltage VO according to a sum AR of the proportional result PR and the integration result IR.

Moreover, at the time point T1 shown in FIG. 3A, the slope SLI of the output current IO is smaller than the first reference slope SL1 or the slope SLV of the output voltage VO is a positive slope (i.e. changing from a negative slope to a positive slope). Thus, the control circuit 140 stops calculating the second calculation value TD2 and stops adding the second calculation value TD2 to the integration result IR, and the control circuit 140 adjusts the duty cycle of the switching signal group CS according to the sum AR of the proportional result PR and the integration result IR.

Since the control circuit 140 adds the second calculation value TD2 associated with the slope SLV of the output voltage VO to the integration result IR over time during a time interval between the time point T0 and the time point T1, and adjusts the duty cycle of the switching signal group CS according to the sum AR of the proportional result PR and the integration result IR, an adjustment speed of the duty cycle of the switching signal group CS is increased, so as to shorten the time required for stabilizing the output voltage VO.

In an embodiment of the invention, the control circuit 140 further adjusts a bandwidth of the control circuit 140 according to the output current IO. Generally, in an application scenario where the load of the power supply apparatus 100 is a light load (i.e., the output current IO is small), since a large adjustment is required for the duty cycle of the switching signal group CS in response to a variation of the output current IO, the bandwidth of the control circuit 140 needs to be increased. By contrast, in an application scenario where the load of the power supply apparatus 100 is a heavy load (i.e., the output current IO is large), since a small adjustment is required for the duty cycle of the switching signal group CS in response to the variation of the output current 10, the bandwidth of the control circuit 140 can be reduced.

Figure 3B:
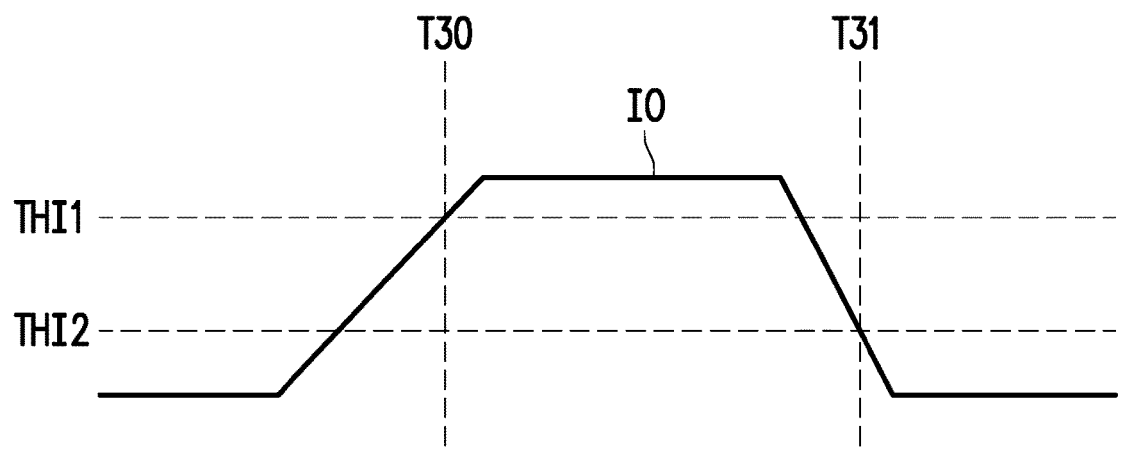
FIG. 3B is a schematic diagram of adjusting a bandwidth of the control circuit according to the output current according to an embodiment of the invention.

In detail, the control circuit 140 adjusts a numerical value of the proportional parameter Kp and a numerical value of the integration parameter Ki according to the output current IO for adjusting the bandwidth of the control circuit 140. Further, FIG. 3B is a schematic diagram of adjusting the bandwidth of the control circuit according to the output current according to an embodiment of the invention. Referring to FIG. 2 and FIG. 3B together, as shown in FIG. 3B, a first threshold current THI1 is greater than a second threshold current THI2. When the output current IO rises to the first threshold current TH1 (for example, at a time point T30 of FIG. 3B), it means that the load of the power supply apparatus 100 is a heavy load, and the control circuit 140 thus decreases the numerical value of the proportional parameter Kp and the numerical value of the integration parameter Ki to reduce the bandwidth of the control circuit 140. Moreover, when the output current IO falls to the second threshold current TH2 (for example, at a time point T31 of FIG. 3B), it means that the load of the power supply apparatus 100 is a light load, and the control circuit 140 thus increases the numerical value of the proportional parameter Kp and the numerical value of the integration parameter Ki to increase the bandwidth of the control circuit 140.

It should be noted that the control circuit 140 adjusts the bandwidth of the control circuit 140 by means of hysteretic control, so that frequent adjustments of the bandwidth of the control circuit 140 can be avoided, thus avoiding oscillations of the output voltage VO.

Details of the control circuit 140 shown in FIG. 2 are further described below. The control circuit 140 includes subtractors 1411 to 1413, adders 1421 to 1423, multipliers 1431 to 1433, a determination unit 1441, sampling delayers 1451 to 1453 represented by a symbol "1/Z", limiters 1461 and 1462, and a switch S3. The subtractor 1411 performs a subtraction operation on the reference voltage VREF and the output voltage VO to generate the error value VE. The multiplier 1431 multiplies the error value VE by the proportional parameter Kp to generate the proportional result PR. The multiplier 1432 multiplies the error value VE by the integration parameter Ki to obtain the first calculation value TI1. The adder 1421 and the sampling delayer 1453 accumulate the first calculation value TI1 over time to obtain the integration result IR, where the limiter 1461 limits a maximum value of the integration result IR. The adder 1422 calculates the sum AR of the proportional result PR and the integration result IR, where the limiter 1462 limits a maximum value of the sum AR.

Moreover, the subtractor 1412 performs a subtraction operation on the output voltage VO and an output voltage VO' sampled and delayed by the sampling delayer 1451 to obtain the slope SLV of the output voltage VO. Similarly, the subtractor 1413 performs a subtraction operation on the output current IO and an output current IO' sampled and delayed by the sampling delayer 1452 to obtain the slope SLI of the output current IO. The determination unit 1441 determines an on/off state of the switch S3 according to the slope SLV of the output voltage VO and the slope SLI of the output current 10.

In detail, when the slope SLI of the output current IO is greater than the first reference slope SL1 and the slope SLV of the output voltage VO is a negative slope, the switch S3 is turned on, such that the multiplier 1433 multiplies the slope SLV of the output voltage VO by the first differential parameter Kd1 to obtain the second calculation value TD2. The adders 1421, 1423 and the sampling delayer 1453 add the second calculation value TD2 to the integration result IR over time. Moreover, when the slope SLI of the output current IO is smaller than the first reference slope SL1 or when the slope SLV of the output voltage VO is a positive slope, the switch S3 is turned off, such that the multiplier 1433 stops calculating the second calculation value TD2.

It should be understood that the control circuit 140 shown in FIG. 2 is substantially a proportional-integral-differential (PID) controller, wherein the control circuit 140 may be implemented by hardware, or software or machine executable program codes stored in a memory and loaded and executed by a microprocessor (or a microcontroller). If implemented by hardware, the control circuit 140 may be implemented by a single integrated circuit chip or by a plurality of circuit chips, but the invention is not limited thereto. The aforementioned plurality of circuit chips or the single integrated circuit chip may be implemented by application specific integrated circuits (ASICs) or field programmable gate arrays (FPGAs) or complex programmable logic devices (CPLDs). The aforementioned memory may be a random access memory (RAM), a read-only memory (ROM) or a flash memory, etc.

In an embodiment of the invention, the control circuit 140 further includes a pulse width modulation (PWM) signal generator, but the invention is not limited thereto. The PWM signal generator generates the switching signal group CS, and adjusts the duty cycle of the switching signal group CS according to the sum AR of the proportional result PR and the integration result IR, where the PWM signal generator may be implemented by an existing PWM signal generating circuit.

Figure 4:
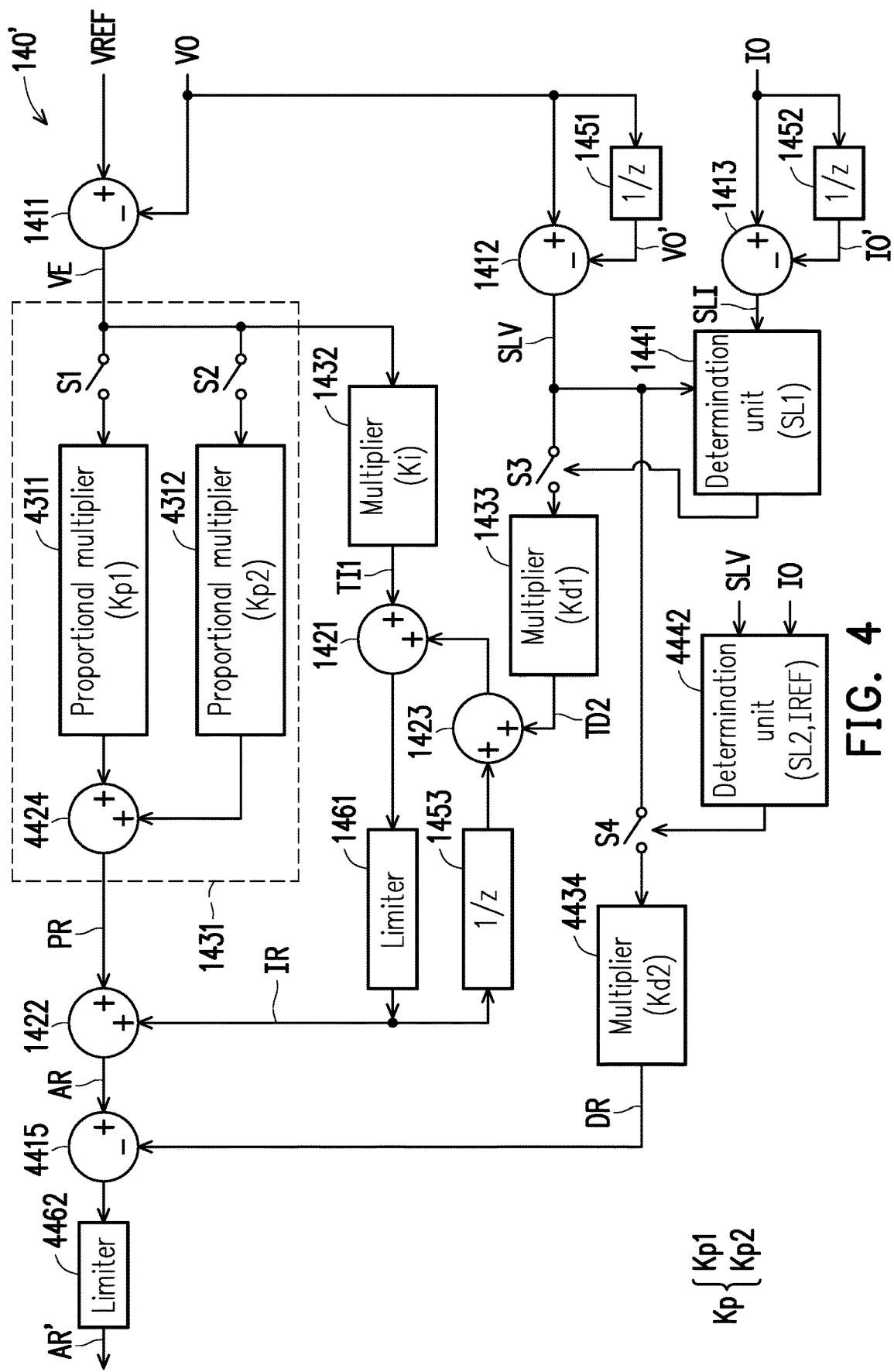
FIG. 4 is a partial functional block diagram of a control circuit according to another embodiment of the invention.

FIG. 4 is a partial functional block diagram of a control circuit according to another embodiment of the invention. Referring to FIG. 1, FIG. 3A and FIG. 4 together, a control circuit 140' of FIG. 4 operates similarly to the control circuit 140 of FIG. 2, and a difference therebetween is that the control circuit 140' further suppresses the sum AR of the proportional result PR and the integration result IR within a time interval TLH after detecting a load variation, so as to avoid an excessive adjustment of the duty cycle of the switching signal group CS which may cause a surge of the output voltage VO.

In detail, during a time point T0' to the time point T1 shown in FIG. 3A, an absolute value of the slope SLV of the output voltage VO is greater than a second reference slope SL2 and the output current IO is greater than a reference current IREF, and the control circuit 140' thus multiplies the slope SLV of the output voltage VO by a second differential parameter Kd2 within the time interval TLH to obtain a differential result DR, and the control circuit 140' adjusts the duty cycle of the switching signal group CS within the time interval TLH according to the proportional result PR, the integration result IR and the differential result DR to suppress the surge of the output voltage VO.

In detail, within the time interval TLH, the control circuit 140' performs a subtraction operation on the sum AR of the proportional result PR and the integration result IR and the differential result DR to obtain a calculation result AR', and adjusts the duty cycle of the switching signal group CS according to the calculation result AR' to suppress the surge of the output voltage VO.

In an embodiment of the invention, the control circuit 140' further adjusts a bandwidth of the control circuit 140' according to a voltage value of the output voltage VO. In detail, the proportional parameter Kp of the control circuit 140' includes a first proportional value Kp1 and a second proportional value Kp2, where the second proportional value Kp2 is smaller than the first proportional value Kp1. When a transient oscillation of the output voltage VO is too large, the control circuit 140' uses the first proportional value Kp1, which is larger than the second proportional value Kp2, as the proportional parameter Kp to increase the bandwidth of the control circuit 140' to thereby suppress the transient oscillation of the output voltage VO. By contrast, when the output voltage VO is within a stable voltage section, the control circuit 140' uses the second proportional value Kp2, which is smaller than the first proportional value Kp1, as the proportional parameter Kp to reduce the bandwidth of the control circuit 140'.

In detail, as shown in FIG. 3A, the first threshold voltage VTH1 is greater than the second threshold voltage VTH2. When the output voltage VO is greater than the first threshold voltage VTH1 or smaller than the second threshold voltage VTH2, it means that the transient oscillation of the output voltage VO is too large, and the control circuit 140' multiplies the error value VE by the first proportional value Kp1 to obtain the proportional result PR.

By contrast, when the output voltage VO is smaller than the first threshold voltage VTH1 and greater than the second threshold voltage VTH2, it means that the output voltage VO is within a stable voltage section, and the control circuit 140' multiplies the error value VE by the second proportional value Kp2 to obtain the proportional result PR.

Details of the control circuit 140' shown in FIG. 4 are described below. The control circuit 140' includes subtractors 1411 to 1413 and 4415, adders 1421 to 1423, multipliers 1431 to 1433 and 4434, determination units 1441 and 4442, sampling delayers 1451 to 1453, limiters 1461 and 4462, and switches S3 and S4. The subtractors 1411 to 1413, the adders 1421 to 1423, the multipliers 1431 to 1433, the determination unit 1141, the sampling delayers 1451 to 1453, the limiter 1461 and the switch S3 of FIG. 4 respectively operate similarly to the subtractors 1411 to 1413, the adders 1421 to 1423, the multipliers 1431 to 1433, the determination unit 1141, the sampling delayers 1451 to 1453, the limiter 1461 and the switch S3 of FIG. 2. Therefore, reference can be made to the related descriptions of FIG. 2.

The determination unit 4442 determines an on/off state of the switch S4 according to the slope SLV of the output voltage VO and the output current 10. In detail, when the absolute value of the slope SLV of the output voltage VO is greater than the second reference slope SL2 and the output current IO is greater than the reference current IREF, the switch S4 is turned on for the time interval TLH, such that the multiplier 4434 multiplies the slope SLV of the output voltage VO by the second differential parameter Kd2 within the time interval TLH to obtain the differential result DR, and the subtractor 4415 subtracts the differential result DR from the sum AR of the proportional result PR and the integration result IR within the time interval TLH to obtain the calculation result AR', where the limiter 4462 limits a maximum value of the calculation result AR'.

Moreover, the multiplier 1431 includes switches S1 and S2, proportional multipliers 4311 and 4312, and an adder 4424. As shown in FIG. 3A, when the output voltage VO is greater than the first threshold voltage VTH1 or smaller than the second threshold voltage VTH2, the switch S1 is turned on and the switch S2 is turned off, such that the proportional multiplier 4311 multiplies the error value VE by the first proportional value Kp1 to generate the proportional result PR. Moreover, when the output voltage VO is smaller than the first threshold voltage VTH1 and greater than the second threshold voltage VTH2, the switch S2 is turned on and the switch S1 is turned off, such that the proportional multiplier 4312 multiplies the error value VE by the second proportional value Kp2 to generate the proportional result PR.

It should be understood that the control circuit 140' is substantially a PID controller. Similar to the control circuit 140 of FIG. 2, the control circuit 140' may also be implemented by hardware, or software or machine executable program codes stored in a memory and loaded and executed by a microprocessor (or a microcontroller).

In an embodiment of the invention, the control circuit 140' further includes a PWM signal generator, but the invention is not limited thereto. The PWM signal generator generates the switching signal group CS, and adjusts the duty cycle of the switching signal group CS according to the calculation result AR', where the PWM signal generator may be implemented by an existing PWM signal generating circuit.

Figure 5:
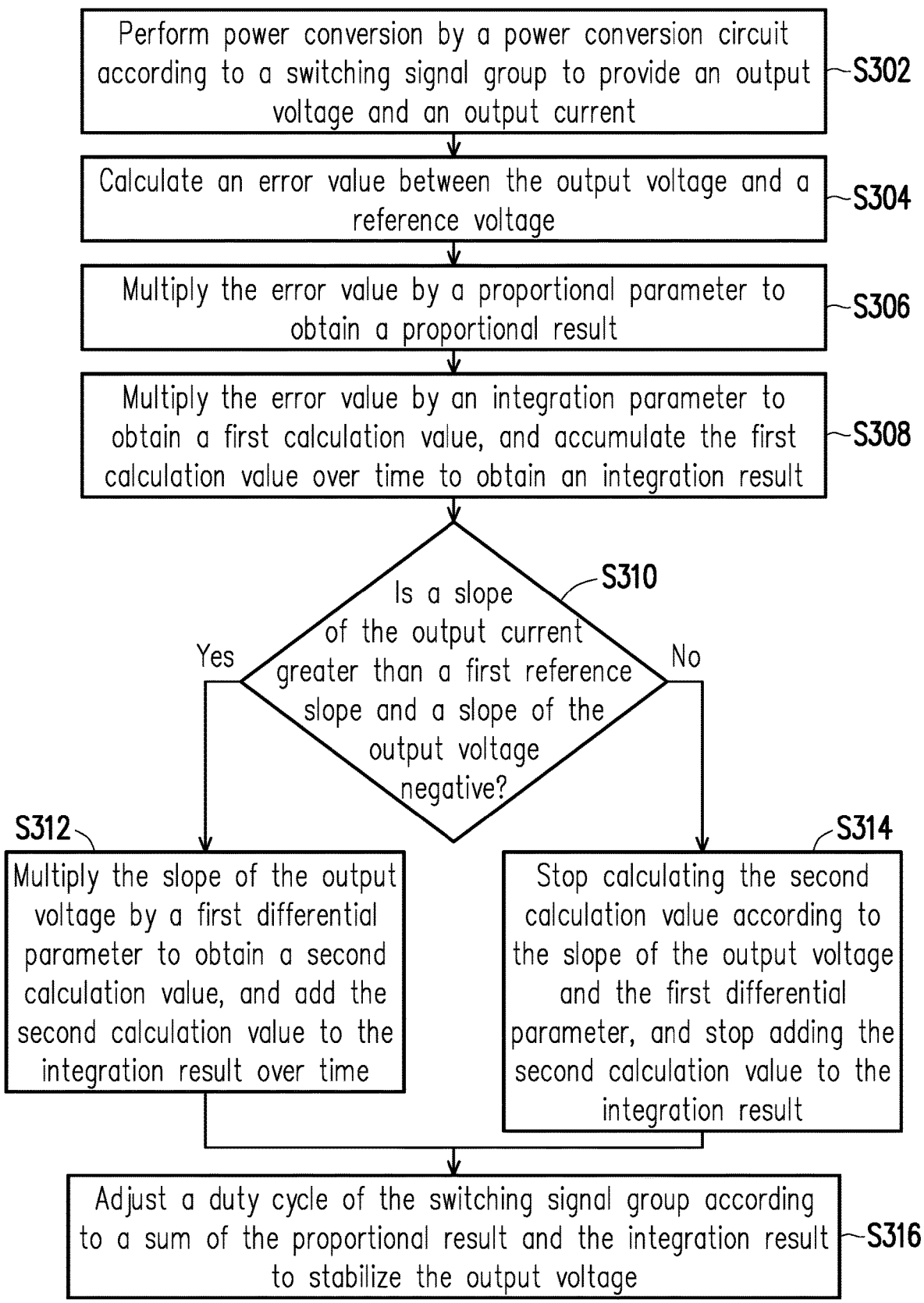
FIG. 5 is a schematic flowchart illustrating a control method of a power supply apparatus according to an embodiment of the invention.

FIG. 5 is a schematic flowchart illustrating a control method of a power supply apparatus according to an embodiment of the invention. Referring to FIG. 1, FIG. 2 and FIG. 5 together, first, in step S302, power conversion is executed by the power conversion circuit 120 according to the switching signal group CS to provide the output voltage VO and the output current IO. Then, steps S304, S306, S308, S310, S312, S314 and S316 are executed by the control circuit 140.

In detail, in step S304, the error value VE between the output voltage VO and the reference voltage VREF is calculated. Thereafter, in step S306, the error value VE is multiplied by the proportional parameter Kp to obtain the proportional result PR. Then, in step S308, the error value VE is multiplied by the integration parameter Ki to obtain the first calculation value TI1, and the first calculation value TI1 is accumulated over time to obtain the integration result IR. Then, in step S310, it is determined whether the slope SLI of the output current IO is greater than the first reference slope SL1 and whether the slope SLV of the output voltage VO is a negative slope. If YES in step S310, in step S312, the slope SLV of the output voltage VO is multiplied by the first differential parameter Kd1 to obtain the second calculation value TD2, and the second calculation value TD2 is added to the integration result IR over time. By contrast, if NO in step S310, in step S314, the calculation of the second calculation value is stopped, and the addition of the second calculation value TD2 to the integration result IR is stopped. In step S316 after step S312 or step S314, the duty cycle of the switching signal group CS is adjusted according to the sum AR of the proportional result PR and the integration result IR to stabilize the output voltage VO.

Figure 6:
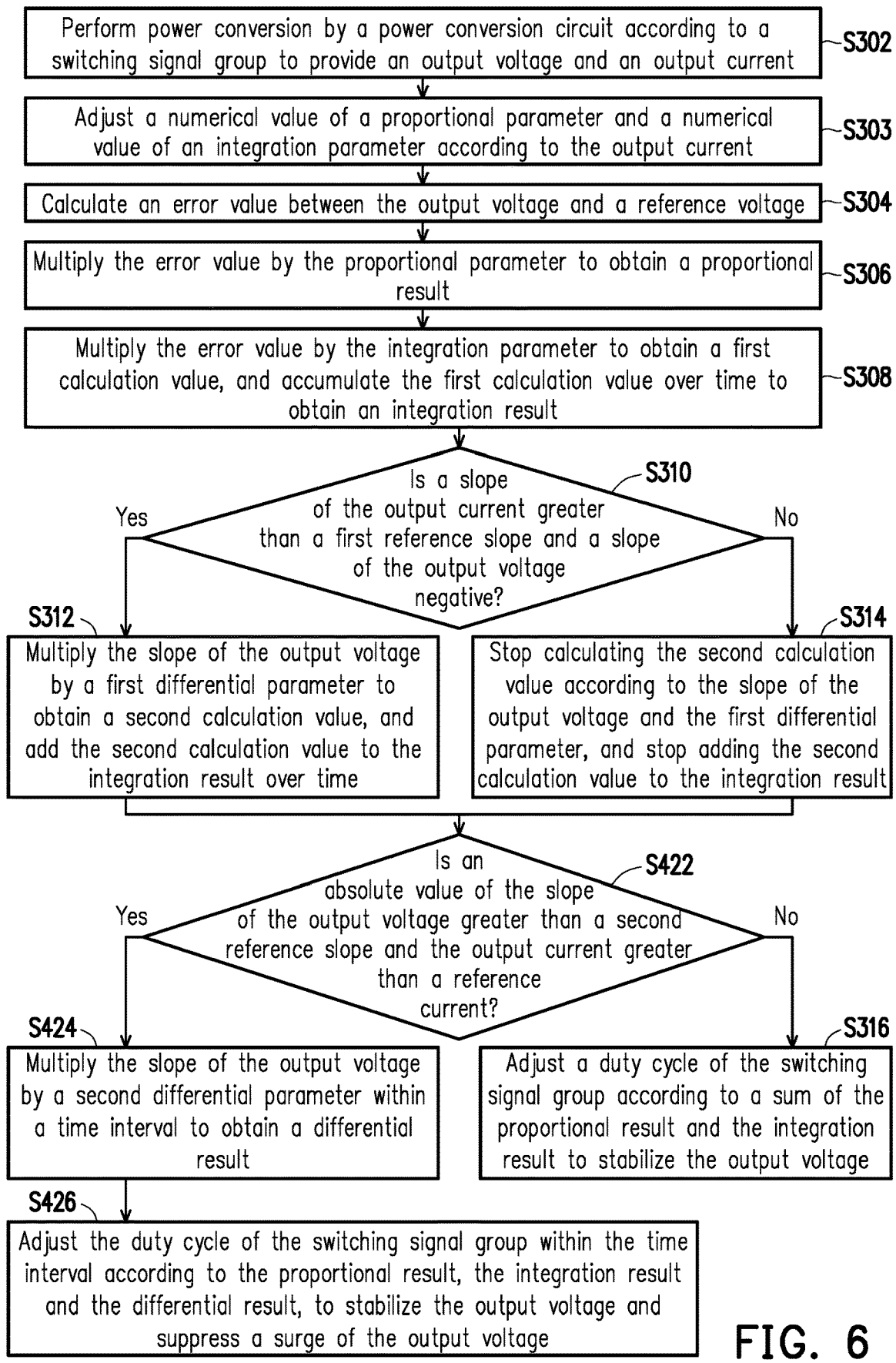
FIG. 6 is a schematic flowchart illustrating a control method of a power supply apparatus according to another embodiment of the invention.

FIG. 6 is a schematic flowchart illustrating a control method of a power supply apparatus according to another embodiment of the invention. Referring to FIG. 1, FIG. 3A, FIG. 4 and FIG. 6 together, the control method of FIG. 6 is similar to the control method of FIG. 5, and a difference therebetween is that the control method of FIG. 6 further includes steps S303, S422, S424 and S426. In detail, between step S302 and step S304 of FIG. 6, the numerical value of the proportional parameter Kp and the numerical value of the integration parameter Ki are adjusted by the control circuit 140' according to the output current IO to adjust the bandwidth of the control circuit 140'.

Moreover, in step S422 after step S312 or step S314, it is determined by the control circuit 140' whether the absolute value of the slope SLV of the output voltage VO is greater than the second reference slope SL2 and whether the output current IO is greater than the reference current IREF. If YES in step S422, in step S424, the slope SLV of the output voltage VO is multiplied by the second differential parameter Kd2 by the control circuit 140' within the time interval TLH to obtain the differential result DR. Then, in step S426, the duty cycle of the switching signal group CS is adjusted by the control circuit 140' within the time interval TLH according to the proportional result PR, the integration result IR and the differential result DR to suppress the surge of the output voltage VO. By contrast, if NO in step S422, in step S316, the duty cycle of the switching signal group CS is adjusted by the control circuit 140' according to the sum AR of the proportional result PR and the integration result IR to stabilize the output voltage VO.

Moreover, sufficient teachings, suggestions and implementation descriptions can be obtained from the descriptions of the embodiments of FIG. 1 to FIG. 4 for details of the control method of the embodiments of FIG. 5 and FIG. 6, which will be omitted.

In summary, in the power supply apparatus and the control method thereof provided by the invention, the control circuit multiplies the slope of the output voltage by the first differential parameter to obtain the second calculation value when the slope of the output current is greater than the first reference slope and the slope of the output voltage is a negative slope, and adds the second calculation value to the integration result over time to serve as a basis for adjusting the duty cycle of the switching signal group. In this way, an adjustment speed of the duty cycle of the switching signal group is increased, so as to improve the stability of the output voltage and shorten the time required for stabilizing the output voltage.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A power supply apparatus, comprising:
    a switch-based power conversion circuit, configured to perform power conversion according to a switching signal group to provide an output voltage and an output current; and
    a control circuit, coupled to the power conversion circuit, and configured to detect the output voltage and the output current to generate the switching signal group accordingly, wherein the control circuit generates an error value according to the output voltage and a reference voltage, multiplies the error value by a proportional parameter to obtain a proportional result, multiplies the error value by an integration parameter to obtain a first calculation value, and accumulates the first calculation value over time to obtain an integration result,
    wherein when a slope of the output current is greater than a first reference slope and a slope of the output voltage is a negative slope, the control circuit multiplies the slope of the output voltage by a first differential parameter to obtain a second calculation value, the control circuit adds the second calculation value to the integration result over time, and the control circuit adjusts a duty cycle of the switching signal group to stabilize the output voltage according to a sum of the proportional result and the integration result,
    wherein
    when the output current rises to a first threshold current, the control circuit decreases a numerical value of the proportional parameter and a numerical value of the integration parameter; and
    when the output current falls to a second threshold current, the control circuit increases the numerical value of the proportional parameter and the numerical value of the integration parameter,
    wherein the first threshold current is greater than the second threshold current.

2. The power supply apparatus as claimed in claim 1, wherein when the slope of the output current is smaller than the first reference slope or the slope of the output voltage is a positive slope, the control circuit stops calculating the second calculation value, the control circuit stops adding the second calculation value to the integration result, and the control circuit adjusts the duty cycle of the switching signal group according to the sum of the proportional result and the integration result.

3. The power supply apparatus as claimed in claim 1, wherein when an absolute value of the slope of the output voltage is greater than a second reference slope and the output current is greater than a reference current, the control circuit multiplies the slope of the output voltage by a second differential parameter within a time interval to obtain a differential result, and the control circuit adjusts the duty cycle of the switching signal group within the time interval according to the differential result to suppress a surge of the output voltage.

4. The power supply apparatus as claimed in claim 1, wherein the proportional parameter comprises a first proportional value, and when the output voltage is greater than a first threshold voltage or smaller than a second threshold voltage, the control circuit multiplies the error value by the first proportional value to obtain the proportional result, wherein the first threshold voltage is greater than the second threshold voltage.

5. The power supply apparatus as claimed in claim 4, wherein the proportional parameter further comprises a second proportional value, and when the output voltage is smaller than the first threshold voltage and greater than the second threshold voltage, the control circuit multiplies the error value by the second proportional value to obtain the proportional result, wherein the second proportional value is smaller than the first proportional value.

6. A control method of a power supply apparatus, wherein the power supply apparatus comprises a switch-based power conversion circuit and a control circuit, the control method comprising:
    performing power conversion by the power conversion circuit according to a switching signal group to provide an output voltage and an output current; and
    executing following steps by the control circuit:
        calculating an error value between the output voltage and a reference voltage;
        multiplying the error value by a proportional parameter to obtain a proportional result;
        multiplying the error value by an integration parameter to obtain a first calculation value, and accumulating the first calculation value over time to obtain an integration result;
        when a slope of the output current is greater than a first reference slope and a slope of the output voltage is a negative slope, multiplying the slope of the output voltage by a first differential parameter to obtain a second calculation value, and adding the second calculation value to the integration result over time;
        adjusting a duty cycle of the switching signal group according to a sum of the proportional result and the integration result to stabilize the output voltage;
        when the output current rises to a first threshold current, decreasing a numerical value of the proportional parameter and a numerical value of the integration parameter; and
        when the output current falls to a second threshold current, increasing the numerical value of the proportional parameter and the numerical value of the integration parameter,
    wherein the first threshold current is greater than the second threshold current.

7. The control method of the power supply apparatus as claimed in claim 6, further comprising:
    when the slope of the output current is smaller than the first reference slope or the slope of the output voltage is a positive slope, executing following steps by the control circuit:
        stopping calculating the second calculation value, and stopping adding the second calculation value to the integration result; and
        adjusting the duty cycle of the switching signal group according to the sum of the proportional result and the integration result.

8. The control method of the power supply apparatus as claimed in claim 6, further comprising:
  when an absolute value of the slope of the output voltage is greater than a second reference slope and the output current is greater than a reference current, executing following steps by the control circuit:
   multiplying the slope of the output voltage by a second differential parameter within a time interval to obtain a differential result; and
   further adjusting the duty cycle of the switching signal group within the time interval according to the differential result to suppress a surge of the output voltage.

9. The control method of the power supply apparatus as claimed in claim 6, wherein the proportional parameter comprises a first proportional value, and the step of multiplying the error value by the proportional parameter to obtain the proportional result comprises:
  when the output voltage is greater than a first threshold voltage or smaller than a second threshold voltage, multiplying the error value by the first proportional value to obtain the proportional result, wherein the first threshold voltage is greater than the second threshold voltage.

10. The control method of the power supply apparatus as claimed in claim 9, wherein the proportional parameter further comprises a second proportional value, and the step of multiplying the error value by the proportional parameter to obtain the proportional result further comprises:
  when the output voltage is smaller than the first threshold voltage and greater than the second threshold voltage, multiplying the error value by the second proportional value to obtain the proportional result, wherein the second proportional value is smaller than the first proportional value.

* * * * *